(12) United States Patent
Yin et al.

(10) Patent No.: US 10,359,678 B2
(45) Date of Patent: Jul. 23, 2019

(54) HIGHLY TUNABLE MAGNETIC LIQUID CRYSTALS

(71) Applicant: The Regents of the University of California, Oakland, CA (US)

(72) Inventors: Yadong Yin, Riverside, CA (US); Mingsheng Wang, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 92 days.

(21) Appl. No.: 15/301,699

(22) PCT Filed: Apr. 6, 2015

(86) PCT No.: PCT/US2015/024541
§ 371 (c)(1),
(2) Date: Oct. 3, 2016

(87) PCT Pub. No.: WO2015/157184
PCT Pub. Date: Oct. 15, 2015

(65) Prior Publication Data
US 2017/0184905 A1 Jun. 29, 2017

Related U.S. Application Data

(60) Provisional application No. 61/976,364, filed on Apr. 7, 2014.

(51) Int. Cl.
G02F 1/137 (2006.01)
C09K 19/54 (2006.01)
(Continued)

(52) U.S. Cl.
CPC .......... G02F 1/13768 (2013.01); C09K 19/38 (2013.01); C09K 19/54 (2013.01);
(Continued)

(58) Field of Classification Search
CPC .......... G02F 1/13768; G02F 1/133528; G02F 1/133553; G02F 1/0036; C09K 19/54
See application file for complete search history.

(56) References Cited

U.S. PATENT DOCUMENTS 4,701,024 A * 10/1987 Kobayashi ............. C09K 19/56
349/130
4,946,623 A * 8/1990 Tabony .................. C09K 19/02
252/299.01

(Continued)

FOREIGN PATENT DOCUMENTS

CN 202171715 U 3/2012
CN 102786840 A 11/2012
WO WO 2015/157184 A1 10/2015

OTHER PUBLICATIONS

PCT International Search Report dated Jul. 15, 2015 issued in PCT/US15/24541.
(Continued)

*Primary Examiner* — Dung T Nguyen
(74) *Attorney, Agent, or Firm* — Tom Hunter; Weaver Austin Villeneuve & Sampson LLP

(57) ABSTRACT

In various embodiments magnetically actuated liquid crystals are provided as well as method of manufacturing such, methods of using the liquid crystals and devices incorporating the liquid crystals. In one non-limiting embodiment the liquid crystals comprise $Fe_3O_4$ nanorods where the nanorods are coated with a silica coating.

19 Claims, 7 Drawing Sheets

(51) Int. Cl.
*H01F 1/00* (2006.01)
*G02F 1/00* (2006.01)
*C09K 19/38* (2006.01)
*G02F 1/1335* (2006.01)
*B82Y 20/00* (2011.01)
*G02F 1/141* (2006.01)
*B82Y 40/00* (2011.01)
*C09K 19/52* (2006.01)
*H01F 1/03* (2006.01)

(52) U.S. Cl.
CPC ...... *G02F 1/0036* (2013.01); *G02F 1/133528* (2013.01); *H01F 1/0018* (2013.01); *B82Y 20/00* (2013.01); *B82Y 40/00* (2013.01); *C09K 2019/521* (2013.01); *G02F 1/133553* (2013.01); *G02F 1/141* (2013.01); *G02F 2001/133531* (2013.01); *H01F 1/0302* (2013.01)

(56) References Cited

U.S. PATENT DOCUMENTS

| | | | |
|---|---|---|---|
| 5,184,233 A * | 2/1993 | Lim | C09K 19/52 349/166 |
| 2005/0130167 A1 | 6/2005 | Bao et al. | |
| 2005/0201941 A1 | 9/2005 | Cho et al. | |
| 2005/0218377 A1 | 10/2005 | Lawandy | |
| 2005/0271745 A1 | 12/2005 | Gruettner et al. | |
| 2006/0216239 A1 | 9/2006 | Zhang et al. | |
| 2006/0286379 A1 | 12/2006 | Gao | |
| 2007/0042137 A1 | 2/2007 | Rao et al. | |
| 2007/0224517 A1 | 9/2007 | Yellen et al. | |
| 2007/0264199 A1 | 11/2007 | Labhasetwar et al. | |
| 2008/0255403 A1 | 10/2008 | Voegele et al. | |
| 2008/0284970 A1 | 11/2008 | Ishitani | |
| 2009/0029392 A1 | 1/2009 | Josephson et al. | |
| 2009/0169478 A1 | 7/2009 | Leuschner et al. | |
| 2010/0003503 A1 | 1/2010 | Seppala et al. | |
| 2010/0051510 A1 | 3/2010 | Lee | |
| 2010/0203313 A1 | 8/2010 | Olsson et al. | |
| 2010/0292564 A1 | 11/2010 | Cantillon Murphy | |
| 2010/0297431 A1 | 11/2010 | Lee | |
| 2011/0037463 A1 | 2/2011 | Bertacco et al. | |
| 2011/0046004 A1 | 2/2011 | Josephson et al. | |
| 2011/0053174 A1 | 3/2011 | Josephson et al. | |
| 2011/0054180 A1 | 3/2011 | Varma et al. | |
| 2011/0085987 A1 | 4/2011 | Wang et al. | |
| 2011/0086297 A1 | 4/2011 | Yellen et al. | |
| 2011/0171715 A1 | 7/2011 | Chang et al. | |
| 2011/0218380 A1 | 9/2011 | Maschke | |
| 2011/0250146 A1 | 10/2011 | Zhang et al. | |
| 2011/0263924 A1 | 10/2011 | Yantasee et al. | |
| 2012/0022792 A1 | 1/2012 | Zysler et al. | |
| 2012/0027865 A1 | 2/2012 | Sahoo et al. | |
| 2012/0052286 A1 | 3/2012 | Norwood et al. | |
| 2012/0094852 A1 | 4/2012 | Berman et al. | |
| 2012/0145601 A1 | 6/2012 | Lee et al. | |
| 2012/0184941 A1 | 7/2012 | Levy et al. | |
| 2012/0239341 A1 | 9/2012 | Liu et al. | |
| 2012/0265001 A1 | 10/2012 | Asmatulu et al. | |
| 2012/0288647 A1 | 11/2012 | Lee et al. | |
| 2012/0329129 A1 | 12/2012 | Chang et al. | |
| 2013/0006092 A1 | 1/2013 | Ferrans et al. | |
| 2013/0096334 A1 | 4/2013 | Varma et al. | |
| 2013/0126394 A1 | 5/2013 | Cheng | |
| 2013/0224073 A1 | 8/2013 | Schmidt, III et al. | |
| 2013/0245357 A1 | 9/2013 | Chauhan et al. | |
| 2013/0302408 A1 | 11/2013 | Weaver | |
| 2013/0302508 A1 | 11/2013 | Sahoo et al. | |
| 2013/0309702 A1 | 11/2013 | Kim et al. | |
| 2014/0022029 A1 | 1/2014 | Glushchenko et al. | |
| 2014/0303022 A1 | 10/2014 | Josephson et al. | |
| 2015/0045691 A1 | 2/2015 | Liu et al. | |
| 2015/0056145 A1 | 2/2015 | Chae et al. | |
| 2015/0148661 A1 | 5/2015 | Weaver et al. | |
| 2015/0213931 A1 | 7/2015 | Kim et al. | |
| 2015/0276902 A1 | 10/2015 | Weaver et al. | |
| 2015/0352231 A1 | 12/2015 | Chou et al. | |
| 2016/0104560 A1 | 4/2016 | Ohkoshi et al. | |
| 2016/0193369 A1 | 7/2016 | Zhang et al. | |
| 2016/0296175 A1 | 10/2016 | Liu et al. | |
| 2016/0320379 A1 | 11/2016 | Josephson et al. | |
| 2016/0363587 A1 | 12/2016 | Kannan et al. | |
| 2017/0000375 A1 | 1/2017 | Demas et al. | |
| 2017/0037450 A1 | 2/2017 | Zourob et al. | |
| 2017/0050040 A1 | 2/2017 | Trembly | |
| 2017/0095579 A1 | 4/2017 | Kim et al. | |
| 2017/0189706 A1 | 7/2017 | Wang | |
| 2017/0239393 A1 | 8/2017 | Yoon et al. | |
| 2018/0003676 A1 | 1/2018 | Kim et al. | |
| 2018/0059114 A1 | 3/2018 | Cho et al. | |

OTHER PUBLICATIONS

PCT International Preliminary Report on Patentability dated Oct. 12, 2016 issued in PCT/US15/24541.
European Extended Search Report dated Oct. 26, 2017 issued in EP 15777356.5.
Behabtu et al. (2010) "Spontaneous high-concentration dispersions and liquid crystals of graphene." *Nat. Nano.* 5(6): 406-11.
Binnemans et al. (2000) "Rare-Earth-Containing Magnetic Liquid Crystals" *J. Am. Chem. Soc.* 122(18): 4335-4344.
Cordoyiannis et al. (2009) "Effects of magnetic nanoparticles with different surface coating on the phase transitions of octylcyanobiphenyl liquid crystal" *Phys. Rev. E* 79: 011702 (1-5).
da Silva et al. (1993) "Anisotropic magnetic fluid: A magnetic liquid crystal?" *Journal of Magnetism and Magnetic Materials* 122: 57-61.
Fabre et al. (1990) "Ferrosmectics: A new magnetic and mesomorphic phase" *Phys. Rev. Lett.* 64(5): 539 (6 pages).
Gabriel et al. (1996) "Observation of Nematic Liquid-Crystal Textures in Aqueous Gels of Smectite Clays" *J. Phys. Chem.* 100(26): 11139-11143.
Hijnen and Clegg (2012) "Simple Synthesis of Versatile Akaganéite-Silica Core—Shell Rods" *Chem. Mater.* 24(17): 3449-3457.
Kim et al. (2012) "LaPO4 Mineral Liquid Crystalline Suspensions with Outstanding Colloidal Stability for Electro-Optical Applications" *Adv. Funct. Mater.* 22(23): 4949-4956.
Lemaire et al. (2004) "Physical properties of aqueous suspensions of goethite (alpha-FeOOH) nanorods. Part I: In the isotropic phase." *The Europ. Phy. J. E* 13: 291-308.
Lemaire et al. (2004) "Physical properties of aqueous suspensions of goethite (alpha-FeOOH) nanorods. Part II: In the nematic phase." *The Europ. Phy. J. E* 13: 309-319.
Li et al. (2002) "Semiconductor Nanorod Liquid Crystals" *Nano. Lett.* 2(6): 557-560.
Vallooran et al. (2011) "Macroscopic Alignment of Lyotropic Liquid Crystals Using Magnetic Nanoparticles" *Adv. Mater.* 23: 3932-37.
van der Beek and Lekkerkerker (2004) "Liquid Crystal Phases of Charged Colloidal Platelets" *Langmuir* 20(20): 8582-8586.
Zorba et al. (2010) "Superparamagnetic Magnetite Nanoparticle Superstructures for Optical Modulation/Chopping" *J. Phys. Chem. C* 114(41): 17868-17873.

* cited by examiner

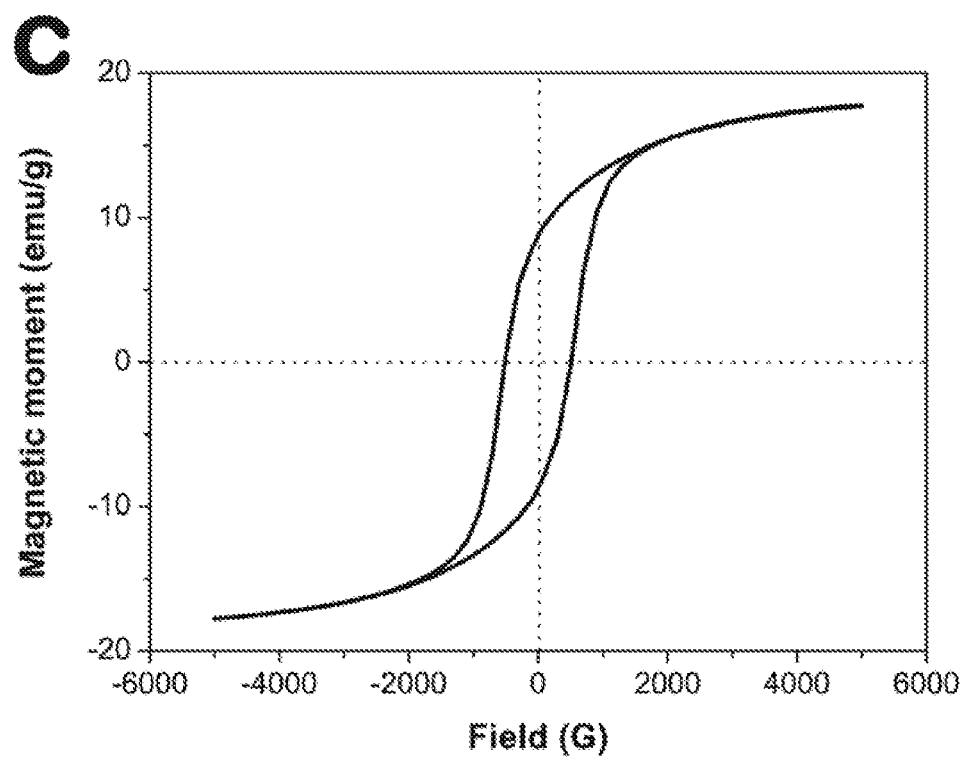
Fig. 1, cont'd.

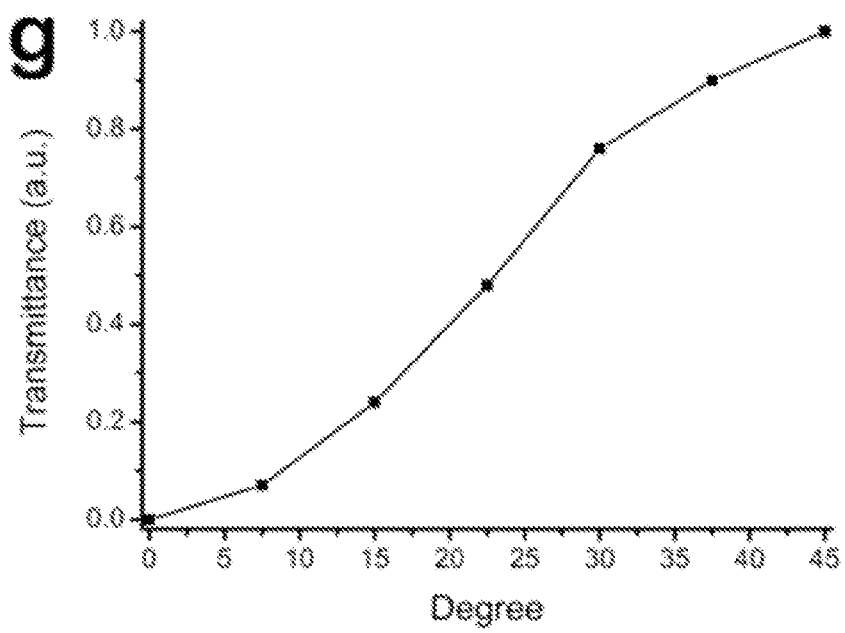
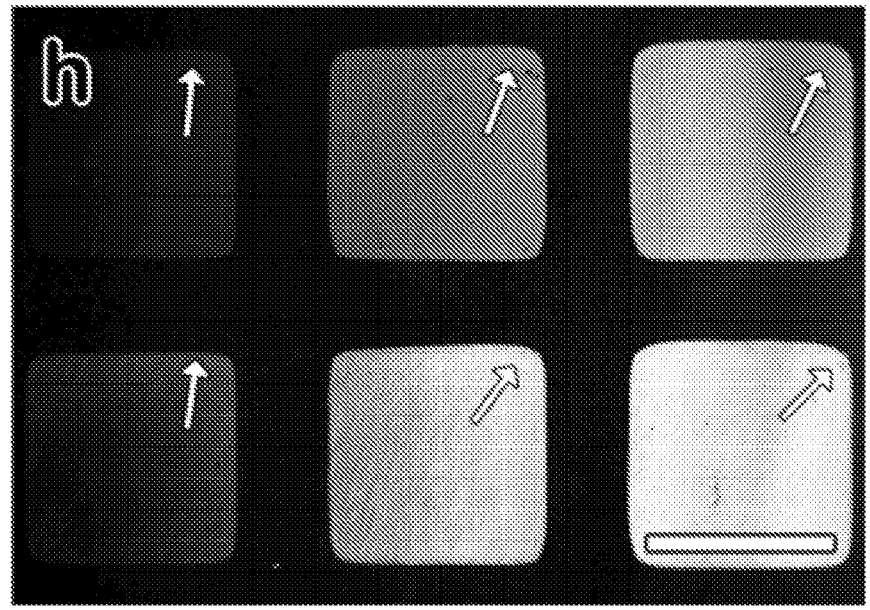
*Fig. 5, cont'd.*

HIGHLY TUNABLE MAGNETIC LIQUID CRYSTALS

CROSS-REFERENCE TO RELATED APPLICATIONS

This application is a US 371 National Phase of PCT/US2015/024541, filed on Apr. 6, 2015, which claims benefit of and priority to U.S. Ser. No. 61/976,364, filed on Apr. 7, 2014, both of which are incorporated herein by reference in their entirety for all purposes.

STATEMENT OF GOVERNMENTAL SUPPORT

This work was supported in part by Grant No DNR00956081 from the National Science Foundation. The Government has certain rights in this invention.

BACKGROUND

Development of magnetic-responsive liquid crystals (LCs) is of both fundamental and practical importance since it not only represents an ideal system in condensed matter that allows exploration of phase complexity in a single sample as the external field changes, but it also opens the way towards various applications that benefit from the instantaneous and contactless nature of magnetic interactions.

Conventional liquid crystals (LCs) are mostly insensitive to magnetic fields. Limited by the low magnetic susceptibility of their components, most studies on previous liquid crystals focus only on the phase behavior of LCs under magnetic fields. It is believed the use of magnetically tunable liquid crystals for practical applications, such as optical switching, has never been demonstrated.

SUMMARY

In various embodiments magnetically actuated liquid crystals are provided as well as method of making the magnetically actuated liquid crystals, methods of using the magnetically actuated liquid crystals (e.g., in optical switching applications, displays, anti-counterfeiting devices and the like), methods of fixing the orientation of the components in the liquid crystals and producing patterns of polarization in the fixed liquid crystals, and devices comprising the magnetically actuated liquid crystals. In certain embodiments the liquid crystals comprise magnetic anisotropic nanostructures (e.g., nanorods) whose surfaces are modified for dispersion if necessary, e.g., coated with a polymer or a silica layer. In certain embodiments the nanostructures are coated with a layer of silica.

In one illustrative, but non-limiting embodiment, liquid crystals are provided that comprise $Fe_3O_4$ nanorods where the nanorods are coated with a silica coating. In certain embodiments the nanorods are provided as a suspension and/or dispersion.

Various embodiments contemplated herein may include, but need not be limited to, one or more of the following:

Embodiment 1

A liquid crystal, said liquid crystal including: a suspension/dispersion of magnetic anisotropic nanostructures.

Embodiment 2

The liquid crystal of embodiment 1, wherein said anisotropic nanostructure includes a material selected from the group consisting of a ferromagnetic material, a ferromagnetic material, and a superparamagnetic material.

Embodiment 3

The liquid crystal according to any one of embodiments 1-2, wherein said anisotropic nanostructure includes a material selected from the group consisting of metallic iron, metallic cobalt, metallic nickel, metallic gadolinium, metallic dysprosium, an alloy containing iron, an alloy containing cobalt, an alloy containing nickel, an alloy containing gadolinium, an alloy containing dysprosium, an oxide of iron, an oxide of cobalt, an oxide of nickel, an oxide of manganese, an oxide of europium, and an oxide of chromium.

Embodiment 4

The liquid crystal of embodiment 2, wherein said lanisotropic nanostructure includes $Fe_3O_4$.

Embodiment 5

The liquid crystal according to any one of embodiments 1-4, wherein said anisotropic structures comprise anisotropic nanostructures selected from the group consisting of nanorods, nanoplates, nanotubes, and nanodiscs.

Embodiment 6

The liquid crystal according to any one of embodiments 1-4, wherein said anisotropic structures comprise nanorods.

Embodiment 7

The liquid crystal according to any one of embodiments 1-6, wherein the average length of the long axis of said anisotropic structures ranges from about 20 nm up to about 10 µm.

Embodiment 8

The liquid crystal of embodiment 7, wherein the average length of the long axis of said anisotropic structures ranges from about 50 nm up to about 10 µm, or from about 100 nm up to about 5 µm.

Embodiment 9

The liquid crystal of embodiment 7, wherein the average length of the long axis of said anisotropic structures ranges from about 20 nm, or from about 50 nm, or from about 100 nm, or from about 200 nm, or from about 300 nm, or from about 400 nm, or from about 500 nm up to about 10 µm, up to about 5 µm, or up to about 4 µm, or up to about 3 µm, or up to about 2 µm.

Embodiment 10

The liquid crystal of embodiment 7, wherein the average length of the long axis of said structures is about 1.5 µm.

Embodiment 11

The liquid crystal according to any one of embodiments 1-10, wherein the average length of the short axis of said anisotropic structures ranges from about 2 nm up to about 1 µm, or from about 100 nm up to about 500 nm, or from about 100 nm up to about 300 nm.

Embodiment 12

The liquid crystal according to any one of embodiments 1-10, wherein the average length of the short axis of said anisotropic structures ranges from about 2 nm or from about 5 nm, or from about 10 nm, or from about 20 nm, or from about 30 nm, or from about 40 nm, or from about 50 nm, or from about 60 nm, or from about 70 nm, or from about 80 nm, or from about 90 nm, or from about 100 nm, up to about 1 µm, or up to about 800 nm, or up to about 500 nm, or up to about 400 nm, or up to about 300 nm.

Embodiment 13

The liquid crystal according to any one of embodiments 1-10, wherein the average length of the short axis of said anisotropic structures is about 200 nm.

Embodiment 14

The liquid crystal according to any one of embodiments 1-13, wherein the ratio of the length of the long axis to the length of the short axis of said anisotropic structures is at least about 1.1 or at least about 1.2, or at least about 1.3, or at least about 1.5, or at least about 2, or at least about 3, or at least about 4, or at least about 5, or at least about 6, or at least about 7, or at least about 8, or at least about 9, or at least about 10, or at least about 11, or at least about 12, or at least about 13, or at least about 14, or at least about 15, or at least about 16, or at least about 17, or at least about 18, or at least about 19, or at least about 20.

Embodiment 15

The liquid crystal according to any one of embodiments 1-14, wherein the surface of said nanostructures is modified to ensure dispersion/suspension in a solvent.

Embodiment 16

The liquid crystal of embodiment 15, wherein the surface of said nanostructure is functionalized with a hydrophilic group.

Embodiment 17

The liquid crystal of embodiment 16, wherein the surface of said nanostructure is functionalized with a group selected from the group consisting of hydroxyl, carboxyl, sulfhydryl, carbonyl, amino, and phosphate.

Embodiment 18

The liquid crystal of embodiment 15, wherein the surface of said nanostructure has a polymer layer or a silica layer thereon.

Embodiment 19

The liquid crystal of embodiment 15, wherein the surface of said nanostructure has a silica layer thereon.

Embodiment 20

The liquid crystal according to any one of embodiments 1-19, wherein said anisotropic nanostructures are suspended/dispersed in a polar solvent, a non-polar solvent, or a mixture of polar and non-polar solvents.

Embodiment 21

The liquid crystal of embodiment 26, wherein said anisotropic nanostructures are suspended/dispersed in a polar solvent.

Embodiment 22

The liquid crystal of embodiment 26, wherein said anisotropic nanostructures are suspended/dispersed in a solution including water.

Embodiment 23

The liquid crystal of embodiment 26, wherein said anisotropic nanostructures are suspended/dispersed in a solution including an alcohol.

Embodiment 24

The liquid crystal of embodiment 23, wherein said anisotropic nanostructures are suspended/dispersed in a solution including an alcohol selected from the group consisting of methanol, ethanol, propanol, 1-butanol, 2-butanol, 2-methyl-1 propanol, 2-methyl-2-propanol, ethylene glycol, methylene glycol, propylene glycol, glycerol, benzyl alcohol, cinnamic alcohol, diethylene glycol, grandisol, cyclohexanol, and octanol.

Embodiment 25

The liquid crystal of embodiment 23, wherein said anisotropic nanostructures are suspended/dispersed in a solution including ethylene glycol.

Embodiment 26

The liquid crystal of embodiment 23, wherein said anisotropic nanostructures are suspended/dispersed in a non-polar solvent.

Embodiment 27

The liquid crystal according to any one of embodiments 1-26, wherein the volume fraction of anisotropic nanostructures in said suspension/dispersion is greater than about 0.1%.

Embodiment 28

The liquid crystal of embodiment 27, wherein the volume fraction of anisotropic nanostructures in said suspension/dispersion ranges from about 0.1% up to about 70%.

Embodiment 29

The liquid crystal according to any one of embodiments 27-28, wherein the volume fraction of anisotropic nanostructures in said suspension/dispersion is greater than about 0.5%, or greater than about 1%, or greater than about 3%, or greater than about 4%, or greater than about 3%, or greater than about 5%, or greater than about 6%, or greater than about 7%, or greater than about 8%, or greater than about 9%, or greater than about 10%, or greater than about 11%, or greater than about 12%, or greater than about 13%, or greater than about 14%, or greater than about 15%, or greater than about 16%, or greater than about 17%, or greater than about 18%, or greater than about 19%, or greater than about 20%.

Embodiment 30

The liquid crystal according to any one of embodiments 1-26, wherein the volume fraction of anisotropic nanostructures in said suspension/dispersion is about 10%.

Embodiment 31

The liquid crystal according to any one of embodiments 27-30, wherein the volume fraction of anisotropic structures in said suspension is sufficient to provide ordered liquid crystalline phases.

Embodiment 32

The liquid crystal according to any one of embodiments 1-31, wherein the anisotropic structures reorient in a magnetic field having intensity less than about 1 T.

Embodiment 33

The liquid crystal of embodiment 32, wherein the anisotropic structures reorient in a magnetic field having an intensity less than about 800 mT, or less than about 500 mT, or less than about 400 mT, or less than about 300 mT, or less than about 200 mT, or less than about 100 mT, or less than about 50 mT, or less than about 25 mT, or less than about 10 mT, or less than about 5 mT, or at about 1 mT.

Embodiment 34

The liquid crystal according to any one of embodiments 1-33, wherein the anisotropic structures are suspended/dispersed in a solution containing polymer or pre-polymer molecules.

Embodiment 35

A device including: a first polarizing layer or film configured to act as a polarizer; a second polarizing layer or film; and a liquid crystal according to any one of embodiments 1-34 disposed between said first polarizing layer or film and said second polarizing layer or film.

Embodiment 36

The device of embodiment 35, wherein said first polarizing layer or film is configured to act as a polarizer.

Embodiment 37

The device of according to any one of embodiments 35-36, wherein said second polarizing layer or film is configured to act as an analyzer.

Embodiment 38

The device of according to any one of embodiments 35-37, wherein the angle of polarization of said first polarizing layer or film differs from the angle of polarization of said second polarizing layer or film.

Embodiment 39

The device of embodiment 38, wherein the angle of polarization of said first polarizing layer or film and the angle of said second polarizing layer or film differ by an amount that ranges from about 0 degrees to about 180 degrees.

Embodiment 40

The device of embodiment 39, wherein the angle of polarization of said first polarizing layer or film and the angle of said second polarizing layer or film differ by about 45 degrees.

Embodiment 41

The device of embodiment 39, wherein the angle of polarization of said first polarizing layer or film and the angle of said second polarizing layer or film differ by about 90 degrees.

Embodiment 42

The device of according to any one of embodiments 35-41, wherein said device further includes a reflective layer disposed behind said first polarizing layer or film and said second polarizing layer or film.

Embodiment 43

The device of according to any one of embodiments 35-42, wherein said device is a component of an apparatus selected from the group consisting of a display, a waveguide, an actuator, and an optical modulator.

Embodiment 44

A method of optical switching, said method including: passing a polarized optical signal through a liquid crystal according to any one of embodiments 1-34; and applying a magnetic field to said liquid crystal to alter the transmission of said liquid crystal to said optical signal.

Embodiment 45

The method of embodiment 44, wherein said magnetic field is switched at a frequency of at least 1 Hz.

Embodiment 46

The method of embodiment 45, wherein said magnetic field is switched at a frequency of at least 5 Hz, or at least 10 Hz, or at least 20 Hz, or at least 50 Hz, or at least 80 Hz, or at least 100 Hz, or at least 150 Hz, or at least 200 Hz.

Embodiment 47

The method according to any one of embodiments 44-46, wherein said method is performed using a device according to any one of embodiments 35-43.

Embodiment 48

A method of fabricating magnetic anisotropic nanostructures for use as magnetic liquid crystals, said method including: preparing nonmagnetic anisotropic nanostructures;

modifying the surface of said nanostructures if necessary to ensure solvent dispersity; and converting said nanostructures into magnetic anisotropic nano structures.

Embodiment 49

A method of fabricating magnetic anisotropic nanostructures for use as magnetic liquid crystals, said method including: preparing magnetic anisotropic nanostructures; and modifying the surface of said nanostructures if necessary to ensure solvent dispersity.

Embodiment 50

The method of embodiment 49, wherein said anisotropic structures comprise a material selected from the group consisting of metallic iron, metallic cobalt, metallic nickel, metallic gadolinium, metallic dysprosium, an alloy containing iron, an alloy containing cobalt, an alloy containing nickel, an alloy containing gadolinium, an alloy containing dysprosium, an oxide of iron, an oxide of cobalt, an oxide of nickel, an oxide of manganese, an oxide of europium, and an oxide of chromium.

Embodiment 51

The method of embodiment 49, wherein said anisotropic structures comprise a material selected from the group consisting of Fe, Co, Ni, Mn, Gd, Dy, Eu, Cr, Zn, Cu, Mg, O, Si, Bi, Y, Sb.

Embodiment 52

The method of embodiment 49, wherein said anisotropic structures comprise a material selected from the group consisting of compounds of Fe, Co, Ni, Mn, Gd, Dy, Eu, Cr, Zn, Cu, Mg, O, Si, Bi, Y, Sb.

Embodiment 53

The method of embodiment 49, wherein said anisotropic structures comprise a material selected from the group consisting of alloys of Fe, Co, Ni, Mn, Gd, Dy, Eu, Cr, Zn, Cu, Mg, O, Si, Bi, Y, Sb.

Embodiment 54

The method of embodiment 49, wherein said anisotropic structures comprise includes $Fe_3O_4$.

Embodiment 55

The method according to any one of embodiments 49-54, wherein said anisotropic structures comprise anisotropic nanostructures selected from the group consisting of nanorods, nanoplates, nanotubes, and nanodiscs.

Embodiment 56

The method according to any one of embodiments 49-54, wherein said anisotropic structures comprise nanorods.

Embodiment 57

The method according to any one of embodiments 49-56, wherein the average length of the long axis of said anisotropic structures ranges from about 20 nm up to about 10 µm.

Embodiment 58

The method of embodiment 57, wherein the average length of the long axis of said anisotropic structures ranges from about 50 nm up to about 10 µm, or from about 100 nm up to about 5 µm.

Embodiment 59

The method of embodiment 57, wherein the average length of the long axis of said anisotropic structures ranges from about 20 nm, or from about 50 nm, or from about 100 nm, or from about 200 nm, or from about 300 nm, or from about 400 nm, or from about 500 nm up to about 10 µm, up to about 5 µm, or up to about 4 µm, or up to about 3 µm, or up to about 2 µm.

Embodiment 60

The method of embodiment 57, wherein the average length of the long axis of said structures is about 1.5 µm.

Embodiment 61

The method according to any one of embodiments 49-60, wherein the average length of the short axis of said anisotropic structures ranges from about 2 nm up to about 1 µm, or from about 100 nm up to about 500 nm, or from about 100 nm up to about 300 nm.

Embodiment 62

The method according to any one of embodiments 49-60, wherein the average length of the short axis of said anisotropic structures ranges from about 2 nm or from about 5 nm, or from about 10 nm, or from about 20 nm, or from about 30 nm, or from about 40 nm, or from about 50 nm, or from about 60 nm, or from about 70 nm, or from about 80 nm, or from about 90 nm, or from about 100 nm, up to about 1 µm, or up to about 800 nm, or up to about 500 nm, or up to about 400 nm, or up to about 300 nm.

Embodiment 63

The method according to any one of embodiments 49-60, wherein the average length of the short axis of said anisotropic structures is about 200 nm.

Embodiment 64

The method according to any one of embodiments 49-63, wherein the ratio of the length of the long axis to the length of the short axis of said anisotropic structures is at least about 1.1 or at least about 1.2, or at least about 1.3, or at least about 1.5, or at least about 2, or at least about 3, or at least about 4, or at least about 5, or at least about 6, or at least about 7, or at least about 8, or at least about 9, or at least about 10, or at least about 11, or at least about 12, or at least about 13, or at least about 14, or at least about 15, or at least about 16, or at least about 17, or at least about 18, or at least about 19, or at least about 20.

Embodiment 65

The method according to any one of embodiments 49-64, wherein said preparing includes preparing nanostructures including FeOOH nanostructures including an $FeCl_3$ precursor.

Embodiment 66

The method according to any one of embodiments 49-65, wherein said modifying the surface of said nanostructures includes modifying said surface with a surfactant.

Embodiment 67

The method according to any one of embodiments 49-65, wherein said modifying the surface of said nanostructures includes functionalizing said surface with a hydophylic group.

Embodiment 68

The method of embodiment 67, wherein said modifying the surface of said nanostructures includes functionalizing said surface with a group selected from the group consisting of hydroxyl, carboxyl, sulfhydryl, carbonyl, amino, and phosphate.

Embodiment 69

The method according to any one of embodiments 49-65, wherein said modifying the surface of said nanostructures includes coating said surface with an oxide coating.

Embodiment 70

The method of embodiment 69, wherein said oxide coating includes silica.

Embodiment 71

The method of embodiment 70, wherein said modifying the surface of said nanostructures includes reacting said nanostructures with a silica alkoxide.

Embodiment 72

The method of embodiment 71, wherein said modifying the surface of said nanostructures includes reacting said nanostructures with a silica alkoxide selected from the group consisting of tetraethyl orthosilicate (TEOS), and tetramethyl orthosilicate (TMOS).

Embodiment 73

The method according to any one of embodiments 49-65, wherein said modifying the surface of said nanostructures includes coating said surface with a polymer coating.

Embodiment 74

The method according to any one of embodiments 48, and 50-73, wherein said converting said modified nanostructures into magnetic anisotropic nanostructures includes reducing said non-magnetic nanostructures.

Embodiment 75

The method according to any one of embodiments 48, and 50-73, wherein said converting said modified nanostructures into magnetic anisotropic nanostructures includes reducing FeOOH in said nanostructures to $Fe_3O_4$.

Embodiment 76

The method according to any one of embodiments 74-75, wherein said reducing is performed using a material selected from the group consisting of diethylene glycol, ethylene glycol, glycerol, borohydride, hydrazine, and hydrogen.

Embodiment 77

The method according to any one of embodiments 48-76, wherein said method further includes purifying and/or concentrating said magnetic anisotropic nanostructures.

Embodiment 78

The method of embodiment 77, wherein said purifying and/or concentrating includes one or more magnetic separation steps.

Embodiment 79

The method according to any one of embodiments 48-78, wherein said magnetic anisotropic nanostructures are concentrated or resuspended to a volume fraction greater than about 0.1%.

Embodiment 80

The method according to any one of embodiments 48-78, wherein said magnetic anisotropic nanostructures are concentrated or resuspended to a volume fraction that ranges 0.1% up to about 70%.

Embodiment 81

The method according to any one of embodiments 48-78, wherein said magnetic anisotropic nanostructures are concentrated or re-suspended to a volume fraction that is greater than about 0.5%, or greater than about 1%, or greater than about 3%, or greater than about 4%, or greater than about 3%, or greater than about 5%, or greater than about 6%, or greater than about 7%, or greater than about 8%, or greater than about 9%, or greater than about 10%, or greater than about 11%, or greater than about 12%, or greater than about 13%, or greater than about 14%, or greater than about 15%, or greater than about 16%, or greater than about 17%, or greater than about 18%, or greater than about 19%, or greater than about 20%.

Embodiment 82

The method according to any one of embodiments 48-78, wherein said magnetic anisotropic nanostructures are concentrated or re-suspended to a volume fraction sufficient to provide ordered liquid crystalline phases.

Embodiment 83

The method according to any one of embodiments 48-82, wherein said anisotropic nanostructures are suspended in a polar solvent, a non-polar solvent, or a mixture of polar and non-polar solvents.

Embodiment 84

The method of embodiment 83, wherein said anisotropic nanostructures are suspended in a polar solvent.

Embodiment 85

The method of embodiment 83, wherein said anisotropic nanostructures are suspended in a solution including water.

Embodiment 86

The method of embodiment 83, wherein said anisotropic nanostructures are suspended in a solution including an alcohol.

Embodiment 87

The method of embodiment 86, wherein said anisotropic nanostructures are suspended in a solution including an alcohol selected from the group consisting of methanol, ethanol, propanol, 1-butanol, 2-butanol, 2-methyl-1 propanol, 2-methyl-2-propanol, ethylene glycol, methylene glycol, propylene glycol, glycerol, benzyl alcohol, cinnamic alcohol, diethylene glycol, grandisol, cyclohexanol, and octanol.

Embodiment 88

The method of embodiment 86, wherein said anisotropic nanostructures are suspended in a solution including ethylene glycol.

Embodiment 89

The method of embodiment 83, wherein said anisotropic nanostructures are suspended in a non-polar solvent.

Embodiment 90

The method of embodiment 83, wherein the anisotropic structures are suspended in a solution containing polymer or pre-polymer molecules.

Embodiment 91

A liquid crystal including silica-coated magnetic anisotropic nanostructures fabricated according to the method of any one of embodiments 48-90.

Embodiment 92

A method of making a thin film patterned with one or more optical polarizations, said method including: providing a substrate having deposited thereon a resin containing anisotropic magnetic nanostructures as recited in any one of embodiments 1-34; applying a magnetic field to said resin to align said anisotropic magnetic nanostructures in all or in one or more regions of said substrate coated with said resin; and curing/crosslinking said resin in all or in one or more regions of said substrate coated with said resin to fix said anisotropic magnetic nanostructures in a first alignment thereby providing a first optical polarization.

Embodiment 93

The method of embodiment 92, further including: applying a magnetic field to a second region of said substrate to align anisotropic magnetic nanostructures in said second region in an orientation different than said first alignment; and curing/crosslinking said resin in said second region to fix the anisotropic magnetic nanostructures aligned in the second region in a second alignment to provide a second optical polarization.

Embodiment 94

The method according to any one of embodiments 92-93, further including: applying a magnetic field to a third region of said substrate to align said anisotropic magnetic nanostructures in said third region in an orientation different than said first alignment and/or said second alignment; and curing/crosslinking said resin in third second region to fix the nanorods aligned in the third region in a third alignment to provide a third optical polarization.

Embodiment 95

The method according to any one of embodiments 92-94, wherein said method includes leaving the resin in one or more regions uncured/uncrosslinked so that the anisotropic magnetic nanostructures in said regions reorient when a magnetic field is applied to said film.

Embodiment 96

The method according to any one of embodiments 92-95, wherein said resin is a UV cured resin and said curing/crosslinking by application of UV light to the region that is to be cured/cross-linked.

Embodiment 97

The method of embodiment 96, wherein said resin is selected from the group consisting of bisphenol-A-diglycidyl-ether-diacrylate (BGEDA), polyethylene-glycol-diacrylate (PEGDA), and poly(diethylene-glycol-carbonate) diacrylate (PGCDA).

Embodiment 98

The method according to any one of embodiments 92-95, wherein said resin is a chemically cured resin and said curing/crosslinking by application of the curing catalyst to the region that is to be cured/cross-linked.

Embodiment 99

The method of embodiment 98, wherein said catalyst is inkjet nanoprinted on the region(s) to be cured.

Embodiment 100

A thin film patterned with one or more optical polarizations, said thin film including: anisotropic magnetic nanostructures as recited in any one of embodiments 1-34, where the anisotropic magnetic nanostructures are disposed in one or more predetermined orientations at different locations in said thin film.

Embodiment 101

The thin film of embodiment 100, wherein said film includes one or more first regions including anisotropic magnetic nanostructures aligned in a first alignment providing a first polarization.

Embodiment 102

The thin film of embodiment 101, wherein said film includes one or more second regions including anisotropic magnetic nanostructures aligned in a second alignment different from said first alignment providing a second polarization different from said first polarization.

Embodiment 103

The thin film of embodiment 102, wherein said film includes one or more third regions including anisotropic magnetic nanostructures aligned in a third alignment different from said first and/or said second alignment providing a third polarization different from said first and/or said second polarization.

Embodiment 104

The thin film according to any one of embodiments 100-103, wherein said film includes one or more regions wherein the anisotropic magnetic nanostructures in said regions are free to reorient when a magnetic field is applied to said film.

Embodiment 105

The thin film according to any one of embodiments 100-104, wherein said film is made according to the method of any one of embodiments 92-99.

DEFINITIONS

Figure 1:
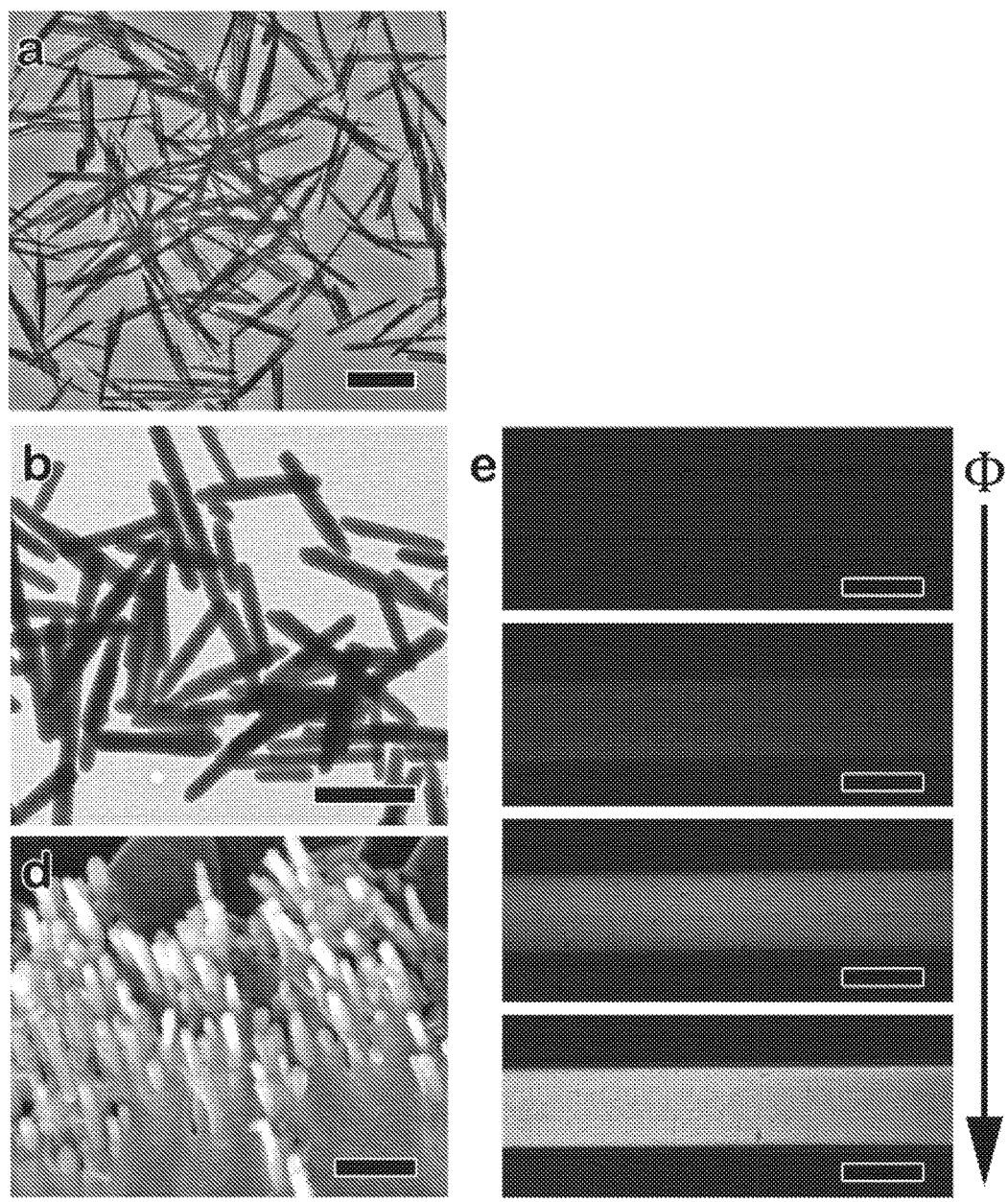
FIG. 1 shows TEM images of (panel a) FeOOH nanorods and (panel b) $Fe_3O_4$@$SiO_2$ nanorods. Scale bars: 1 μm; (panel c) magnetic hysteresis loop of $Fe_3O_4$@$SiO_2$ nanorods; (panel d) SEM image of a fixed magnetic liquid crystal in a polymer matrix showing the ordered arrangement of magnetic nanorods. Scale bars: 1 μm; (panel e) POM images of aqueous dispersions of $Fe_3O_4$@$SiO_2$ nanorods in a capillary tube at different volume fractions (Φ) of 1%, 3%, 5% and 10% (from top to bottom). Scale bars: 500 μm.

The terms "suspension" and "dispersion" are used interchangeably herein to refer to nanostructures present in a fluid (or polymerized) medium. In certain embodiments the nanostructures are homogenously dispersed in the medium, while in other embodiments, the nanostructures are not homogenously dispersed. In certain embodiments the nanoparticle provide one or a plurality of phases in the medium.

DETAILED DESCRIPTION

In various embodiments magnetically actuated liquid crystals are provided as well as method of making the magnetically actuated liquid crystals, methods of using the liquid crystals (e.g., in optical switching applications, displays, and the like), and devices comprising the liquid crystals. In certain embodiments the liquid crystals comprise magnetic anisotropic nanostructures (e.g., nanorods and nanoplates). If necessary, the surfaces of these magnetic anisotropic nanostructures are modified with additional coating for enhanced dispersion in solvents, e.g., coated with a layer of capping ligands, or polymer, or inorganic oxides such as silica. In certain embodiments the nanostructures are coated with a silica layer.

In one illustrative, but non-limiting embodiment for the fabrication of liquid crystals, superparamagnetic iron oxide nanorods or nanoplates are synthesized, and their surfaces are modified with capping ligands, or oxide such as silica, or polymer for enhanced dispersion (if necessary). The nanorods or nanoplates can be dispersed in a suitable solvent at a certain volume fraction to form magnetically actuated liquid crystals. These liquid crystals show an outstanding magnetic response and magnetic-field-controlled instant and reversible orientation.

In one illustrative, but non-liming embodiment, for the fabrication of liquid crystals, ferrimagnetic iron oxide nanorods or nanoplates are synthesized, and their surfaces modified with capping ligands, or oxide such as silica, or polymer for enhanced dispersion (if necessary). Then they were dispersed in suitable solvent at a certain volume fraction to form magnetically actuated liquid crystals. These liquid crystals show an outstanding magnetic response and magnetic-field-controlled instant and reversible orientation.

In one illustrative but non-limiting embodiment, nonmagnetic FeOOH nanorods ARE first synthesized, followed by a coating of silica on their surfaces, and are finally reduced to superparamagnetic or ferrimagnetic iron oxide nanorods encapsulated in a silica layer by diethylene glycol at elevated temperature. The as-reduced nanorods can be dispersed in water or polar solvent at a certain volume fraction, e.g., 10%, and magnetically to provide actuated liquid crystals. Dependent on the volume fraction, this liquid crystal can form nematic or smectic phases. These liquid crystals show an outstanding magnetic response and magnetic-field-controlled instant and reversible orientation tuning is demonstrated.

In one illustrative, but non-liming embodiment, for the fabrication of liquid crystals,nonmagnetic Ni(OH)$_2$ nanoplates are first synthesized, followed by a coating of SiO$_2$ on their surfaces, and finally reduced to Fe$_3$O$_4$@SiO$_2$ nanorods by hydrogen. The as-reduced nanoplates were dispersed in water or polar solvent at a certain volume fraction, and magnetically actuated liquid crystals were achieved. Dependent on the volume fraction, this liquid crystal can form nematic or columnar or hexagonal phases. These liquid crystals show an outstanding magnetic response and magnetic-field-controlled instant and reversible orientation.

In one illustrative, but non-liming embodiment, for the fabrication of liquid crystals, nonmagnetic nanorods or nanoplates were first synthesized, followed by a coating of polymer on their surfaces, and were finally reduced to ferromagnetic core@polymer nanostructures. The as-reduced nanostructures were dispersed in water or polar solvent at a certain volume fraction to form magnetically actuated liquid crystals. These liquid crystals show an outstanding magnetic response and magnetic-field-controlled instant and reversible orientation.

In one illustrative, but non-liming embodiment, for the application of magnetically actuated liquid crystals in displays, but non-limiting embodiment, magnetically actuated liquid crystals were sandwiched between cross polarizers to form a device. As the field direction changes, this device can tune the transmittance of light. An alternating magnetic field was applied to the device (e.g., 5 mT), the liquid crystal exhibited an optical switching frequency of above 100 Hz, which is comparable to commercial liquid crystals and thus can be a promising substitute for them in device applications. Color filters are attached to this device to create a proto-type of magnetically responsive liquid crystal color display.

In one illustrative, but non-liming embodiment, for the application of magnetically actuated liquid crystals in polarization pattern printing, but non-limiting embodiment, magnetically actuated liquid crystals were mixed with photocurable polymer precursors, and sandwiched between glasses. A mask was applied to the sample; liquid crystals in selected areas were cured by ultraviolet light and their orientations were fixed with the aid of magnetic fields. The mask was then removed to allow the curing of liquid crystals in the rest areas and the fixing of their orientation in a different direction with the aid of magnetic fields. This process can be repeated for multiple times for the creation of complex patterns.

EXAMPLES

The following examples are offered to illustrate, but not to limit the claimed invention.

Example 1

Magnetically Actuated Liquid Crystals

The liquid-like behavior and optical anisotropy of liquid crystals have catalyzed many important applications in modern technology. Their molecular order can be manipulated through external stimuli such as temperature change and electric and magnetic fields, therefore enabling many technological advances, with a particularly successful example being the liquid crystal displays driven by electric fields. Although conventional liquid crystals may be sensitive to magnetic fields, the low magnetic susceptibility of molecular species makes practical applications difficult as extremely strong magnetic fields are required to enable effective switching of the molecular order (Kneppe et al. (1982) Chem. Phys. Lett. 87: 59; Lemaire et al. (2004) Phys. Rev. Lett. 93: 267801; van den Pol et al. (2009) Phys. Rev. Lett. 103: 160952).

Herein we demonstrate that ferrimagnetic inorganic nanorods can be used as building blocks to construct liquid crystals with optical properties that can be instantly and reversibly controlled by manipulating the nanorod orientation using considerably weak external magnetic fields. Under an alternating magnetic field (5 mT), they exhibit an optical switching frequency above 100 Hz, which is comparable to the performance of commercial liquid crystals based on electrical switching. Developing such magnetically actuated liquid crystals opens the door towards various applications, which may benefit from the instantaneous and contactless nature of magnetic manipulation (Yang and Wu, Fundamentals of liquid crystal devices. Wiley SID series in display technology (John Wiley, Chichester; Hoboken, N.J., 2006), pp. xvi, 378 p; Boamfa et al. (2005) Adv. Mater. 17: 610).

Effective switching of the optical properties of liquid crystals using external magnetic fields has remained a great challenge. While direct incorporation of ferro- or ferrimagnetic materials into liquid crystals has been attempted (Fabre et al. (1990) Phys. Rev. Lett. 64: 539, Vallooran et al. (2011) Adv. Mater. 23: 3932; Cordoyiannis et al. (2009) Phys. Rev. E 79), a long interaction time is usually required to induce uniform molecular alignment. A more straightforward strategy is to enhance the intrinsic magnetic property of the constituents of liquid crystals, for example, by doping rare earth metal ions into liquid crystal molecules (Binnemans et al. (2000) J. Am. Chem. Soc. 122: 4335) or by developing alternative inorganic building blocks with a higher magnetic susceptibility (Hijnen, and Clegg (2012) Chem. Mater. 24: 3449). However, most such studies have been limited to paramagnetic materials, which can only be aligned in extremely strong external magnetic fields (>1 T). In this regard, the direct use of ferro- or ferrimagnetic inorganic materials represents the best solution to design magnetically responsive liquid crystals because they have higher magnetic susceptibility and can rapidly respond to a relatively weak magnetic field. In such systems, the magnetic interaction energy, instead of the nematic potential in the cases involving diamagnetic/paramagnetic materials, dominates the orientation behavior of liquid crystals, so that the orientational control and the optical switching can be effectively carried out with orders of magnitude reduction in the required field strength but with high magnetic ordering efficiency. Onsager theoretically predicted in his pioneering work the spontaneous nematic ordering of long hard rods in the purely entropic regime (Onsager (1949) Ann. N.Y. Acad. Sci. 51: 627), leaving the remaining challenges of developing a controlled synthesis for anisotropically shaped magnetic nanostructures, and more importantly, their effective stabilization as a liquid dispersion because particles with net magnetic dipole moments usually aggregate due to magnetic dipole-dipole interactions.

Studies on inorganic liquid crystals have been limited to molecular species or highly polydisperse disk- and rod shaped inorganic colloids such as gibbsite ($Al(OH)_3$) and boehmite (AlO(OH)) platelets (van der Beek and Lekkerkerker (2004) Langmuir 20: 8582), platelike smectite clays (Gabriel et al. (1996) J. Phys. Chem. 100: 11139), graphene sheets (Behabtu et al. (2010) Nat. Nano. 5: 406), geothite nanorods (Lemaire et al. (2004) The Europ. Phy. J. E 13: 291), $GdPO_4$ and $LaPO_4$ nanorods (Kim et al. (2012) Adv. Funct. Mater. 22: 4949), or semiconductor nanorods of CdSe (Li et al. (2002) Nano. Lett. 2: 557). Magnetic anisotropic nanostructures with a uniform size, well defined shape, and good solution dispersity can be synthesized using various solution phase and gas phase deposition methods.

We can also design indirect strategies that involve the preparation of nonmagnetic anisotropic nanostructures as precursors, surface passivation to enhance the colloidal stability, and then conversion of the precursors into magnetic anisotropic nano structures. As one example, we chose FeOOH nanorods as the starting material, which can be easily prepared through a hydrolysis reaction. A representative transmission electron microscopy (TEM) image of the nanorods is shown in FIG. 1, panel a. The FeOOH nanorods were further coated with a layer of silica through a sol-gel process, and then reduced to $Fe_3O_4$ by diethylene glycol at 220° C. As shown in FIG. 1, panel b, the product maintains a well-defined rod-like morphology, with an average length of 1.5 μm and diameter of 200 nm. Magnetic measurement confirms the ferrimagnetic nature of the $Fe_3O_4$ nanorods, showing a saturated magnetization of 18 emu/g and a coercivity of 300 Oe. The surface silica layer plays an important role in the stabilization of the colloidal dispersion of magnetic nanorods: it acts as a physical barrier to separate the magnetic cores from each other, attenuate their magnetic dipole-dipole interactions, and prevent them from aggregating. The abundant hydroxyl groups on the silica surface provide sufficient long-range electrostatic repulsion and short-range solvation forces for stabilizing the magnetic nanorods, granting them excellent dispersibility in various polar solvents such as water and alcohols.

Upon the application of an external magnetic field, the magnetic nanorods align themselves along the field direction, producing the orientational order needed for the formation of liquid crystals. Since the average size of the nanorods is much larger than the detection limit of small angle X-ray scattering measurement, resolving the crystal structure of the sample in the magnetic field is difficult to achieve. An alternative method which allows us to directly observe the alignment of the nanorods is to fix the nanorods in a polymer matrix. In this case, $Fe_3O_4$@$SiO_2$ nanorods were dispersed in a UV curable poly(ethylene glycol) diacrylate (PEGDA) resin at a volume fraction (Φ) of 10%. Under an external magnetic field, the dispersion was exposed to UV light to initiate polymerization. Afterwards, the polymerized solid was cut and its cross section was examined using scanning electron microscopy (SEM). As shown in FIG. 1, panel d, a uniform alignment of nanorods could be observed, which confirms the orientational order of the nanorods that leads to liquid crystal properties, although it is still difficult to resolve positional order by using this method. FIG. 1, panel e shows the polarized optical microscopy (POM) images of the aqueous dispersions of $Fe_3O_4$@$SiO_2$ nanorods at different volume fractions from 1% to 10%, clearly indicating a transition from an isotropic phase to a more ordered nematic phase as the volume fraction increased, and confirmed the liquid crystal behavior of the dispersions.

Figure 2:
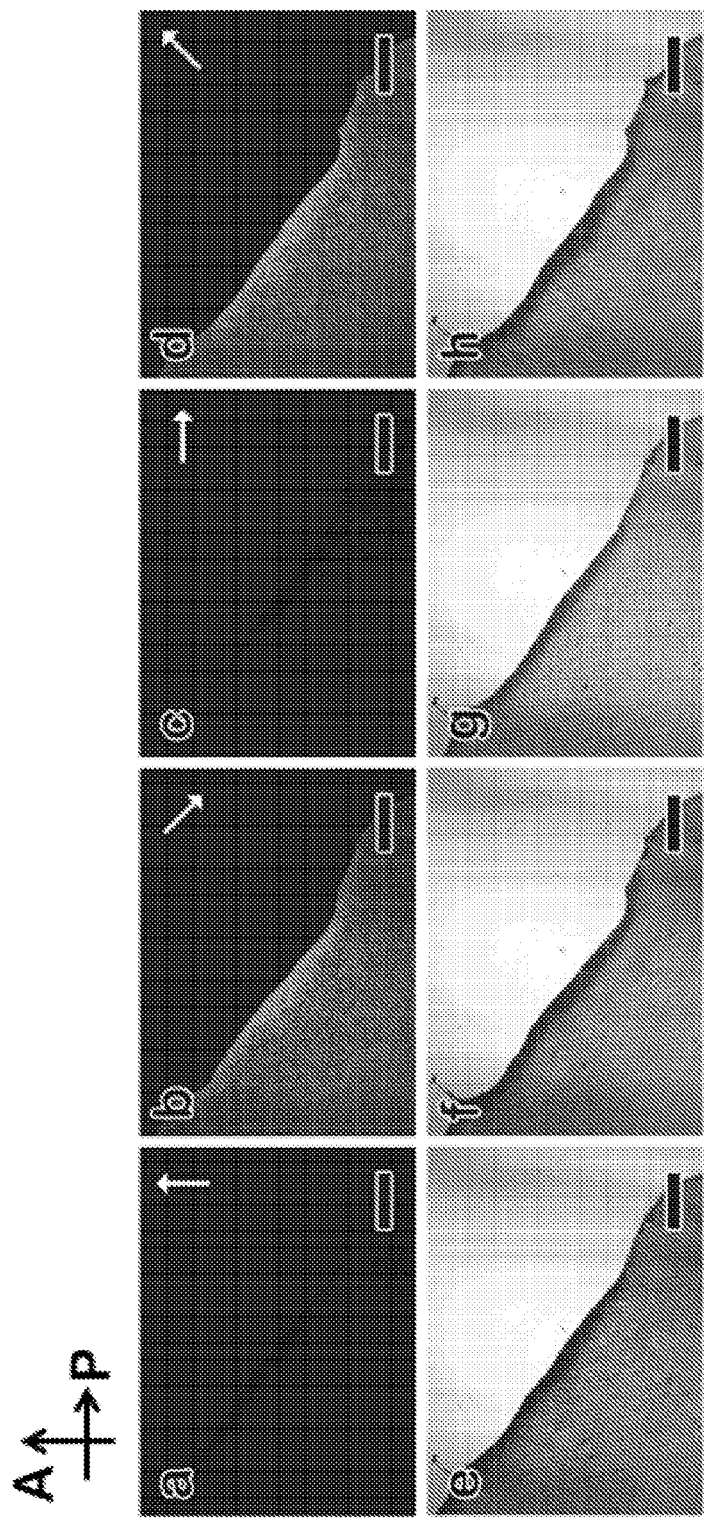
FIG. 2, (panels a-d) POM images and (panels e-h) bright-field OM images of a magnetic liquid crystal film under magnetic fields oriented in different directions. Black arrows at the top-left indicate the transmission axis of the polarizer (P) and analyzer (A). White arrows indicate the field direction. The top-right corner in each image contains no sample. Scale bars: 500 μm.

We then demonstrated the optical tuning of such liquid crystal by a magnetic field. The orientation of the nanorods was found to vary with the direction of the magnetic field, resulting in visual changes under POM. Note that the strength of the magnetic fields used in this work is fixed at ~10 G, unless otherwise specified. The intensity of light transmitted through a liquid crystal sandwiched between cross polarizers can be typically described as:

$$I=I_0 \sin^2(2\alpha)\sin^2(\pi\Delta nL/\lambda) \qquad (1)$$

where $I_0$ is the intensity of light passing through the first polarizer; α is the angle between the transmission axes of the polarizer and the long axis of the liquid crystal; Δn is the difference in the refractive indices along the long axis and short axis for liquid crystals aligned at a specific angle; L is the sample thickness; and λ is the wavelength of incident light. The birefringence of the sample dispersion was measured to be 0.15 and did not show significant change as the field strength increased, indicating good alignment of the nanorods. When the field direction is parallel or perpendicular to the polarizer, α is equal to zero or 90°, leading to dark optical views (FIG. 2, panels a c). As the field direction turns to 45° relative to the polarizer, α changes to 45°, so that the intensity reaches the maximum according to Equation 1, resulting in bright views, as shown in FIG. 2, panels b and d. In contrast, the corresponding bright field optical microscopy images of the same sample did not show apparent differences in the darkness of the view in response to the changes in the direction of the magnetic field, as indicated in FIG. 2, panels e-h.

Figure 3:
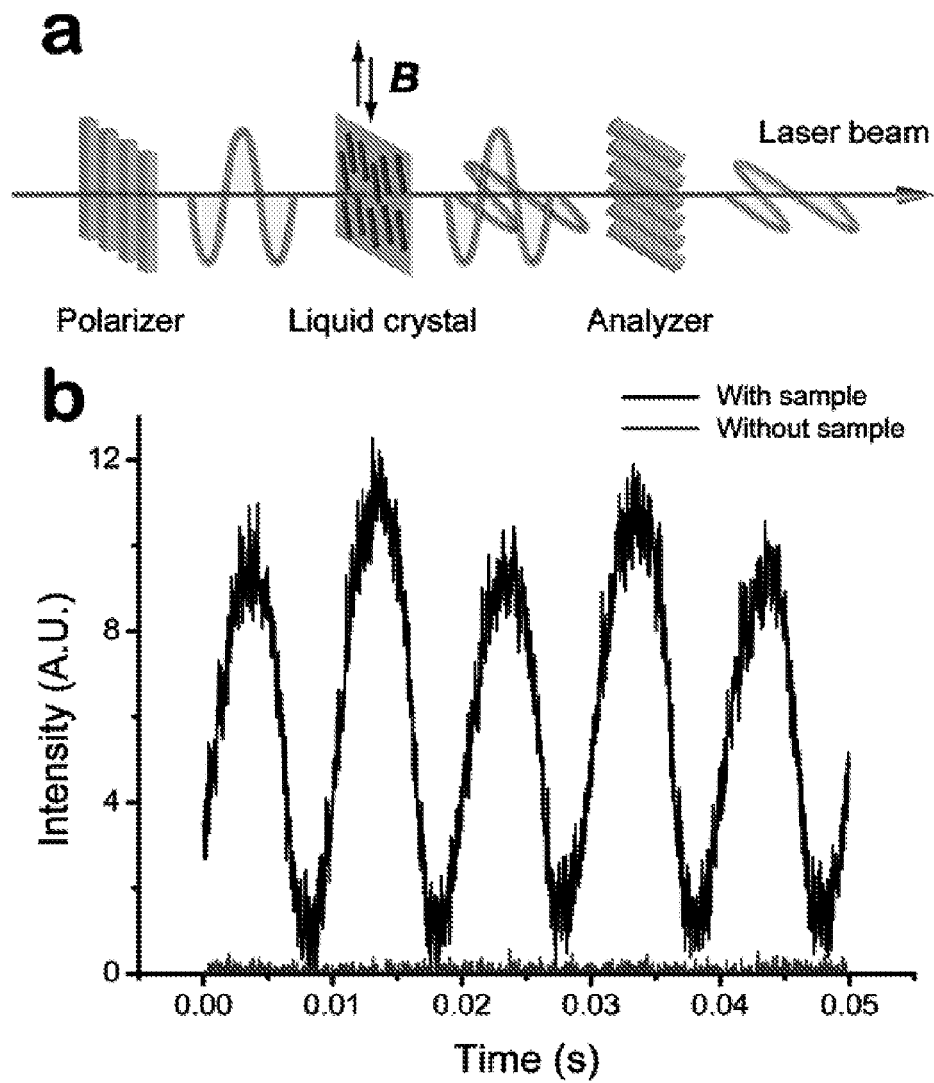
FIG. 3 (panel a) Scheme showing the optical switching process, and (panel b) the transmittance intensity profile of a magnetic liquid crystal under an alternating magnetic field.

The magnetic liquid crystals can rapidly respond to changes in the direction of external magnetic fields. A video demonstrates the continuous optical switching of a liquid crystal in a rotating magnetic field. In order to obtain a quantitative understanding of its switching frequency, we studied the optical properties of the liquid crystal under a high-frequency alternating magnetic field. Upon application of the magnetic field, the nanorods oscillate as a result of the quick switching of field polarity from one direction to the opposite (Zorba et al. (2010) *J. Phys. Chem. C* 114: 17868). As the orientation of the nanorods is temporarily displaced from the equilibrium position, which is parallel to the transmission axis of the polarizer, a laser beam passes through the cross polarizer and gives a detectable signal. The black curve in FIG. 3, panel a, indicates that this liquid crystal exhibits a rapid response to an alternating 5 mT field. The transmittance changes drastically within 0.01 s, corresponding to a switching frequency of 100 Hz, while in a control experiment, no transmittance change is observed in the absence of the liquid crystal sample (red curve).

Figure 4:
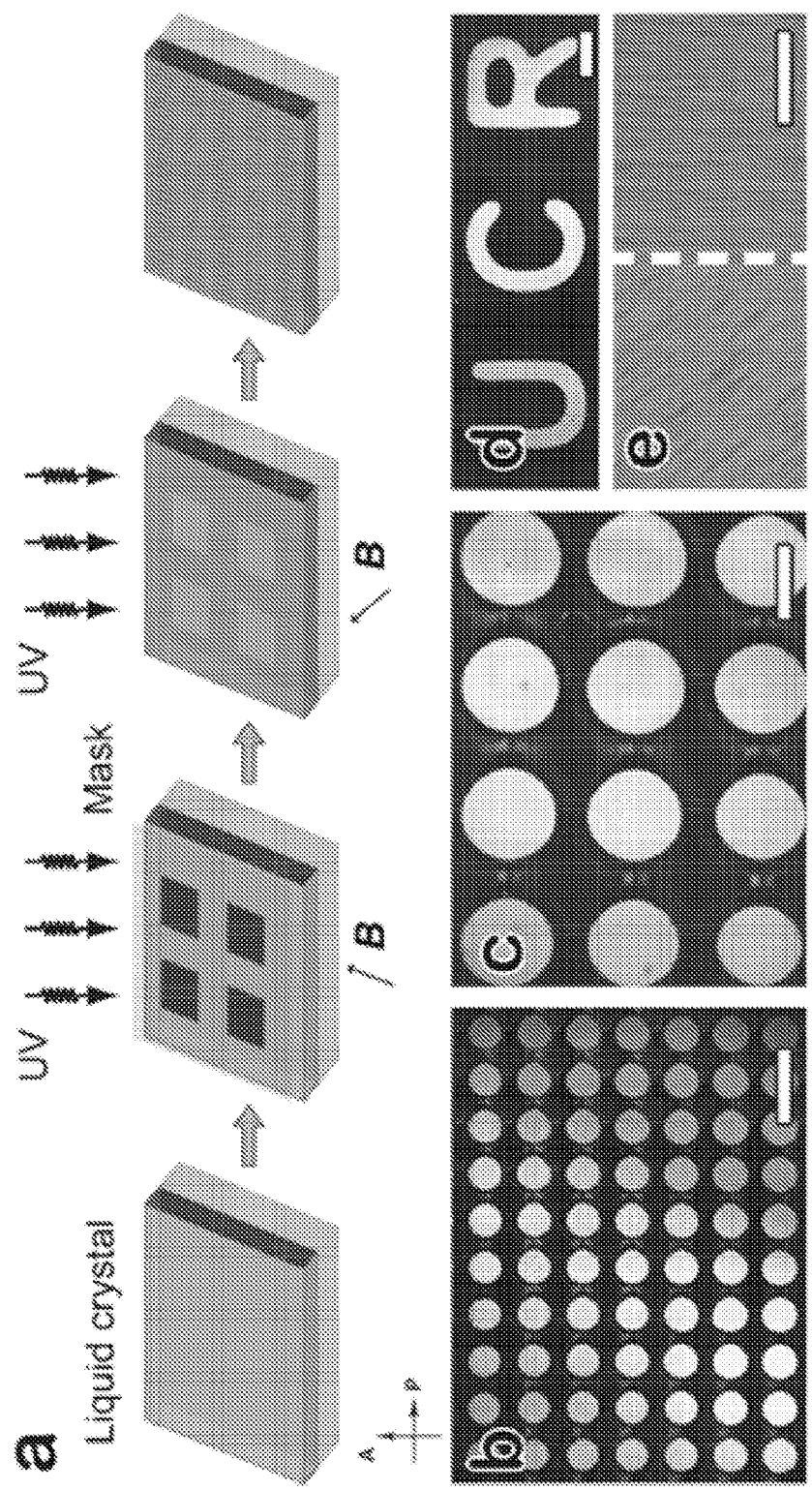
FIG. 4 (panel a) Scheme showing the lithography process for the fabrication of thin films with patterns of different polarizations; (panels b-d) POM images of various polarization-modulated patterns; (panel e) enlarged OM image shows the arrangement of nanorods in the pattern (left) and surrounding area (right). Scale bars: (panels b-d) 500 μm; (panel e) 10 μm.

One of the advantages of inorganic-nanostructure-based liquid crystals is the possibility for convenient fixation of the orientational order. Here we further demonstrate that thin films patterned with various optical polarizations can be conveniently produced by combining the magnetic liquid crystals with lithography processes. As schematically shown in FIG. 4, panel a, a liquid crystal solution containing magnetic nanorods and PEGDA resin was first sandwiched between a glass cover slip and a glass slide to form a liquid film. A photomask was then placed on top of the sample, followed by the application of a magnetic field. Upon exposure to UV light, the orientation of the nanorods in the uncovered regions was fixed along a specific direction within the plane of the film. The photomask was then removed and the sample was again exposed to UV light in the presence of a magnetic field rotated 45° (in plane) from the initial field direction. In the end we obtained a thin film with polarization patterns showing different transmittances to a polarized light. FIG. 4, panels b-d, displays the POM images of as-prepared samples after the application of different patterns. In these cases, the transmission axis of the polarizer was set to be parallel to the initial field direction. The areas cured during the first exposure appear dark under the POM, owing to the parallel arrangement of the nanorods relative to the transmission axis of the polarizer, while the areas cured during the second exposure are bright since all nanorods are oriented 45° relative to the transmission axis of the polarizer. An enlarged bright field optical microscopy image is shown in FIG. 4, panel e, which accentuates the alignment of the nanorods at the boundary of the bright (left)

and dark (right) areas (separated by the dotted line), and clearly confirms the 45° angle between the two orientations.

Figure 5:
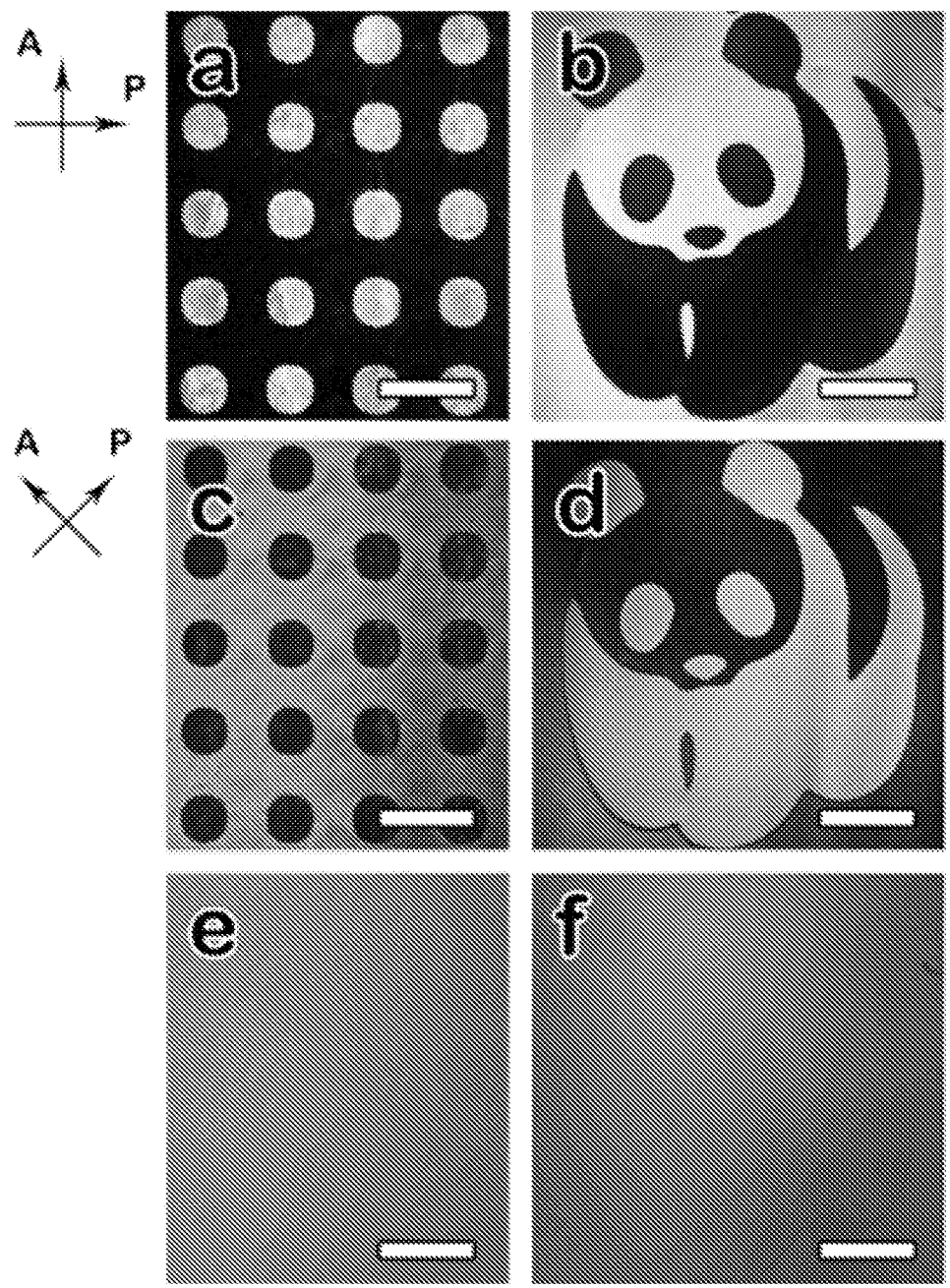
FIG. 5 (panels a-d) POM images of two polarization-modulated patterns under cross polarizers before (panels a,b) and after (panels c,d) shifting the direction of the transmission axis of the polarizers for 45°; (panels e,f) bright-field images of the same patterns; (panel g) plot showing the dependence of the transmittance of the thin film on the angle between the nanorod orientation and the transmission axis of the polarizer; (panel h) POM image of a single thin film patterned with different brightness in different areas by controlling the relative orientation of the nanorods, which is indicated by the white arrows. Scale bars: 500 μm.

Changing the orientation of the nanorods relative to the transmission axis of the polarizer allows convenient modulation of the transmittance intensity. As depicted in the extreme cases in FIG. 5, panels a-d, shifting the transmission axis of the polarizer to be parallel to the direction of the second field completely reverses the dark and bright areas, while almost no contrast can be observed under their brightfield optical images (FIG. 5, panels e and f). In FIG. 5, panel g, we have plotted the dependence of measured transmittance on the angle between the orientation of the nanorods and the transmission axis of the polarizer, which is in accordance with Equation 1. The transmittance of the polarized light of the film or consequently its brightness under POM can be fully modulated by controlling the relative orientation of the nanorods in different areas during the lithographic processes. FIG. 5, panel h, demonstrates a single film with varying brightness in different areas fabricated by a multi-step lithography process, in which the magnetic field was gradually shifted from 0° to 45° relative to the transmission axis of the polarizer. The polarization dependent transmittance of the pattern may be immediately applicable in anti-counterfeiting devices. Interestingly, if we only perform the first curing process, the uncured areas remain in the liquid phase so that the orientation of the nanorods within can still be tuned by magnetic fields, allowing continuous change in the contrast between the pattern and the background.

Depending on the direction of the applied external field, the liquid crystals alter the polarization of light and are thus able to control the intensity of the light transmitted through them. Optical switching tests indicate that this liquid crystal is extremely sensitive to the directional change of external magnetic fields and exhibits an instant response within 0.01 s. The magnetic nanorods can also be dispersed in a UV curable resin to produce thin film liquid crystals, the orientation of which can be fixed completely or in selected areas by combining magnetic alignment and lithography processes, allowing the creation of patterns of different polarizations and control over the transmittance of light in particular areas.

The magnetically actuated liquid crystal is expected to provide a new platform for fabricating novel optical devices that can be widely applied in many fields, such as displays, waveguides, actuators, optical modulators, and anti-counterfeiting features.

Experimental

Synthesis of FeOOH Nanorods:

The synthesis of FeOOH nanorods is based on a previous report with small modifications. Typically, 7.776 g of anhydrous $FeCl_3$ were dissolved in 80 mL water. The solution was added into 450 µL of 37% HCl and then centrifuged at 11000 rpm for 3 min for the removal of unsolvable precipitates. The purified solution was heated to 98° C. in a 100 mL three-neck flask with refluxing and was then maintained for 16 hrs. The solid product was collected by centrifugation after the reaction and washed by water for several times.

Silica Coating of FeOOH Nanorods:

30 mg of as-prepared FeOOH nanorods was dispersed in 20 ml of water, and 1 ml, 0.1M PAA solution was added for the surface modification of nanorods. After overnight stirring, the nanorods were recovered by centrifugation and were redispersed in 3 mL $H_2O$. 1 mL of ammonia solution was then added, followed by the addition of 20 mL ethanol and 100 µL of TEOS. After 1 hr, the silica-coated nanorods were collected by centrifugation, washed by water for several times and redispersed in 2 mL of water.

Conversion of FeOOH@$SiO_2$ Nanorods to $Fe_3O_4$@$SiO_2$ Nanorods:

With the protection of nitrogen, 60 mL of diethylene glycol was heated to 220° C., to which 2 mL of FeOOH@$SiO_2$ dispersion was added. The color of the mixture changes from yellow to brownish, and finally black. The conversion usually takes 24 hrs, after which magnetic nanorods were collected by centrifugation, washed by ethanol for several times and dispersed in 5 mL of water.

Assembling $Fe_3O_4$@$SiO_2$ Nanorods into Liquid Crystal:

As-reduced $Fe_3O_4$@$SiO_2$ nanorods were further purified by magnetic separation for three times. Then they were concentrated to a volumetric fraction of 10% to allow the formation of liquid crystal. Dispersions with different volumetric fractions were also prepared by the same procedure.

Photopolymerization of Liquid Crystal:

A mixture solution of 7:3 polyethylene glycol diacrylate (PEGDA, Mn: 700) to water was prepared. As-reduced $Fe_3O_4$@$SiO_2$ nanorods were dispersed in the mixture solution and purified by magnetic separation for three times. The solution was then concentrated to a volumetric fraction of 10%. Photoinitiator was added into the solution at a mass fraction of 5%. For the photopolymerization, each time 5 µL of solution was used, sandwiched between one cover glass and one glass slide, and then exposed under uv-light for 20 seconds.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A liquid crystal, said liquid crystal comprising:
a suspension of magnetic nanorods, where said magnetic nanorods are coated with a silica and/or polymer layer and form a stable colloidal dispersion, where said magnetic nanorods function as a liquid crystal that performs optical switching in response to a magnetic field.

2. The liquid crystal of claim 1, wherein:
said anisotropic nanostructure comprises a material selected from the group consisting of a ferromagnetic material, a ferromagnetic material, and a superparamagnetic material; or
said anisotropic nanostructure comprises a material selected from the group consisting of metallic iron, metallic cobalt, metallic nickel, metallic gadolinium, metallic dysprosium, an alloy containing iron, an alloy containing cobalt, an alloy containing nickel, an alloy containing gadolinium, an alloy containing dysprosium, an oxide of iron, an oxide of cobalt, an oxide of nickel, an oxide of manganese, an oxide of europium, and an oxide of chromium; or
said anisotropic nanostructure comprises $Fe_3O_4$.

3. The liquid crystal of claim 1, wherein:
the average length of the long axis of said nanorods ranges from about 20 nm up to about 10 µm; or
the average length of the long axis of said nanorods ranges from about 50 nm up to about 10 µm, or from about 100 nm up to about 5 µm; or
the average length of the long axis of said nanorods ranges from about 20 nm, or from about 50 nm, or from about 100 nm, or from about 200 nm, or from about 300 nm, or from about 400 nm, or from about 500 nm up to about 10 µm, up to about 5 µm, or up to about 4 µm, or up to about 3 µm, or up to about 2 µm; or the average length of the long axis of said nanorods is about 1.5 µm; and/or the average length of the short axis of said nanorods ranges from about 2 nm up to about 1 µm, or from about 100 nm up to about 500 nm, or from about 100 nm up to about 300 nm; or the average length of the short axis of said nanorods ranges from about 2 nm or from about 5 nm, or from about 10 nm, or from about 20 nm, or from about 30 nm, or from about 40 nm, or from about 50 nm, or from about 60 nm, or from about 70 nm, or from about 80 nm, or from about 90 nm, or from about 100 nm, up to about 1 µm, or up to about 800 nm, or up to about 500 nm, or up to about 400 nm, or up to about 300 nm; or the average length of the short axis of said nanorods is about 200 nm; and/or the ratio of the length of the long axis to the length of the short axis of said nanorods is at least about 1.2, or at least about 1.3, or at least about 1.5, or at least about 2, or at least about 3, or at least about 4, or at least about 5, or at least about 6, or at least about 7, or at least about 8, or at least about 9, or at least about 10, or at least about 11, or at least about 12, or at least about 13, or at least about 14, or at least about 15, or at least about 16, or at least about 17, or at least about 18, or at least about 19, or at least about 20.

4. The liquid crystal of claim 1, wherein the surface of said nanorod is functionalized with a hydrophilic group.

5. The liquid crystal of claim 4, wherein the surfaces of said nanorods are functionalized with a group selected from the group consisting of hydroxyl, carboxyl, sulfhydryl, carbonyl, amino, and phosphate.

6. The liquid crystal of claim 1, wherein the surfaces of said nanorods have a silica layer thereon.

7. The liquid crystal of claim 1, wherein said nanorods are suspended/dispersed in a polar solvent, a non-polar solvent, or a mixture of polar and non-polar solvents.

8. The liquid crystal of claim 7, wherein said nanorods are suspended/dispersed in 2a solution comprising water; or in a solution comprising an alcohol, or in a solution comprising ethylene glycol.

9. The liquid crystal of claim 1, wherein:
the volume fraction of nanorods in said suspension/dispersion is greater than about 0.1%; or
the volume fraction of nanorods in said suspension/dispersion ranges from about 0.1% up to about 70%; or
the volume fraction of nanorods in said suspension/dispersion is greater than about 0.5%, or greater than about 1%, or greater than about 3%, or greater than about 4%, or greater than about 3%, or greater than about 5%, or greater than about 6%, or greater than about 7%, or greater than about 8%, or greater than about 9%, or greater than about 10%, or greater than about 11%, or greater than about 12%, or greater than about 13%, or greater than about 14%, or greater than about 15%, or greater than about 16%, or greater than about 17%, or greater than about 18%, or greater than about 19%, or greater than about 20%; or
the volume fraction of nanorods in said suspension/dispersion is about 10%.

10. The liquid crystal of claim 9, wherein the volume fraction of nanorods in said suspension is sufficient to provide ordered liquid crystalline phases.

11. The liquid crystal of claim 1, wherein:
the nanorods reorient in a magnetic field having intensity less than about 1 T; or
the nanorods reorient in a magnetic field having an intensity less than about 800 mT, or less than bout 500 mT, or less than about 400 mT, or less than about 300 mT, or less than about 200 mT, or less than about 100 mT, or less than about 50 mT, or less than about 25 mT, or less than about 10 mT, or less than about 5 mT, or at about 1 mT.

12. The liquid crystal of claim 1, wherein said nanorods comprise $Fe_3O_4@SiO_2$ nanorods.

13. The liquid crystal of claim 1, wherein said liquid crystal exhibits an instant response within 0.01 s.

14. A device comprising:
a first optical polarizing layer or film configured to act as a polarizer;
a second optical polarizing layer or film; and
a liquid crystal of claim 1 disposed between said first polarizing layer or film and said second polarizing layer or film.

15. The device of claim 14, wherein:
said first polarizing layer or film is configured to act as a polarizer; and/or
said second polarizing layer or film is configured to act as an analyzer.

16. A method of optical switching, said method comprising:
passing a polarized optical signal through a liquid crystal of claim 1; and
applying a magnetic field to said liquid crystal to alter the transmission of said liquid crystal to said optical signal.

17. A method of fabricating magnetic nanorods for use as magnetic liquid crystals, said method comprising:
preparing nonmagnetic nanorods;
modifying the surface of said nanorods if necessary to ensure solvent dispersity; and
converting said nanorods into magnetic nanorods.

18. A liquid crystal comprising silica-coated magnetic nanorods fabricated according to the method of claim 17.

19. A method of fabricating magnetic nanorods for use as magnetic liquid crystals, said method comprising:
preparing magnetic nanorods; and
modifying the surface of said nanorods with a silicon or polymer coating to provide solvent dispersity.

* * * * *